United States Patent [19]

Mizusawa

[11] Patent Number: 4,757,331

[45] Date of Patent: Jul. 12, 1988

[54] RECORDER HAVING INK SUPPLY MEANS FOR MOVABLE INK TANK

[75] Inventor: Nobutoshi Mizusawa, Tokyo, Japan

[73] Assignee: Canon Kabuskiki Kaisha, Tokyo, Japan

[21] Appl. No.: 838,327

[22] Filed: Mar. 11, 1986

[30] Foreign Application Priority Data

| | | | |
|---|---|---|---|
| Mar. 19, 1985 | [JP] | Japan | 60-55141 |
| Mar. 19, 1985 | [JP] | Japan | 60-55142 |
| Mar. 19, 1985 | [JP] | Japan | 60-55143 |
| Mar. 19, 1985 | [JP] | Japan | 60-55144 |

[51] Int. Cl.[4] .................... G01D 15/16

[52] U.S. Cl. .................... 346/140 R; 137/594; 251/149.7

[58] Field of Search .................... 346/140, 75; 137/594; 251/149.7, 149.6

[56] References Cited

U.S. PATENT DOCUMENTS

| | | | |
|---|---|---|---|
| 2,628,850 | 2/1953 | Summerville | 251/149.7 |
| 3,715,099 | 2/1973 | Shendure | 251/149.6 X |
| 4,143,853 | 3/1979 | Abramson | 251/149.7 X |
| 4,178,595 | 12/1979 | Jinnai | 346/140 R |
| 4,187,511 | 2/1980 | Robinson | 346/140 X |
| 4,496,959 | 1/1985 | Frerichs | 346/140 |
| 4,631,556 | 12/1986 | Watanabe | 346/140 R |

*Primary Examiner*—Joseph W. Hartary
*Attorney, Agent, or Firm*—Fitzpatrick, Cella, Harper & Scinto

[57] ABSTRACT

A recorder having an ink re-supply system for a moving ink tank has a movable record element for recording data, a first tank movable with the record element, a fixed second tank, a recording liquid path connecting the two tanks, and a supply device for supplying recording liquid during periods when the recording liquid path is established. Structure is also provided for connecting and disconnecting the recording liquid path. The connection/disconnection structure includes an opening through which part of the recording liquid path extends. The recorder can also include a flexible curtain blade for protecting the inside of the recording liquid path and through which the recording liquid path extends when it is established by the connection/disconnection means structure.

37 Claims, 5 Drawing Sheets

RECORDER HAVING INK SUPPLY MEANS FOR MOVABLE INK TANK

BACKGROUND OF THE INVENTION

1. Field of the Invention

The present invention relates to a recorder, and more particularly to a recorder for recording on a record medium by recording liquid.

2. Related Background Art

In a conventional recorder, a carriage on which a record element is mounted scans over a record medium to record data. A flexible ink supply tube is connected to the record element to supply ink to the record element as the carriage is moved, and the ink is supplied from an ink tank at a fixed position through the ink supply tube.

In this method, since the ink is supplied through the flexible ink supply tube, a locus of movement of the ink supply tube is not defined and a large movement space is required. This is a barrier to a compact apparatus.

In another proposed method, a flexible tube is not used to supply the ink. Instead, an ink supply path to supply ink to a first ink tank mounted on the carriage and movable with the record element from a second ink tank located at a fixed position, is temporarily established when the carriage is at a predetermined position, and the ink is supplied through the ink supply path.

FIG. 1 is a sectional view of an ink jet printer which supplies the ink in the manner described above. Numeral 1 denotes an ink jet head mounted on a carriage 3 which is movable along a slide shaft 2, numeral 4 denotes a supply tube for supplying ink from a first tank 5 in the carriage 3 to the ink jet head 1, numeral 6 denotes a level sensor for detecting remainder of the ink in the first tank 5, and numeral 7 denotes an opening formed on a side of the first tank 5 for forming a supply path. FIG. 1 shows a state in which the carriage 3 is at a home position and the ink supply path from a second tank (not shown) to the first tank 5 is established. A needle pipe 8 is inserted into the first tank 5 through the opening 7. Numeral 9 denotes a flange which limits the amount of insertion of the needle pipe 8, numeral 10 denotes a compression spring which limits the insertion force of the needle pipe 8, and numeral 11 denotes a supply tube for connecting the needle pipe 8 with the second tank (not shown). Numeral 12 denotes a carriage which supports the needle pipe 8 to be axially movable. It is supported on a slide shaft 15 by a slide bearing 16 and a bearing housing 17 and driven left and right by a pinion gear 14 coupled to a motor (not shown) and a rack 13.

When the level sensor 6 detects that the amount of ink remaining in the first tank 5 is small, the carriage 3 is moved along the slide shaft 2, stops at the home position, and the carriage 12 which has been standing by at a rightward position is moved in a direction of the arrow so that the needle pipe 8 is inserted into the opening 7 formed in the first tank 5 on the carriage 3 to establish the ink supply path.

In order to establish the supply path in this method, the center of the opening 7 and the center of the needle pipe 8 must be aligned. In the apparatus shown in FIG. 1, the needle pipe 8 can be relatively easily inserted into the opening 7 because a diameter of the opening 7 is much larger than a diameter of the needle pipe 8.

On the other hand, in an ink jet printer, as the viscosity of ink at the leading end of the nozzle increases, the ink is not discharged. This problem may be resolved by applying a high pressure to the ink behind the nozzle to eject the high viscosity ink at the leading end of the nozzle. However, since air readily leaks from a clearance between the needle pipe 8 and the opening 7, the high pressure cannot be applied to the ink in this arrangement. In order to allow the application of high pressure to the ink in the arrangement of FIG. 1, a sealing member such as an O-ring may be used in the opening 7. However, if the O-ring is mounted in the opening 7, the center of the O-ring and the center of the needle pipe 8 must be aligned with a much higher accuracy than that required in FIG. 1, because even a slight misalignment will lead to a large increase of the insertion force since the needle pipe 8 shown in FIG. 1 is supported with a freedom of only axial direction.

In FIG. 1, one pair of opening and needle pipe are used. In a color ink jet printer, at least four pairs (and eight pairs if ink circulation is required) of supply path establishing means are necessary (to supply yellow, magenta, cyan and black inks to heads). Therefore, very high precision for the positions of the opening and arrangement of the needle pipes is required. Because centering errors of the respective supply path establishing means are not exactly zero, the supply path establishing means interfere with each other when the needle pipes are inserted, and a very large insertion force is required. Thus, in order to develop a very large moment on the slide shaft along which the carriage slides and apply a large radial load to the slide bearing and to attain high precision and assure durability, the diameter of the slide shaft must be unreasonably increased.

On the other hand, in an ink jet printer which records data by ink, the leading end of the nozzle of the record element or orifice is clogged due to the increase of viscosity of the ink at a low temperature, or by evaporation of water at a high temperature. Thus, high pressure is applied to the ink in the supply path to eject the high viscosity ink at the leading end of the nozzle or the orifice to restore the print function of the record element.

However, in the method in which the ink supply path is temporarily established to supply the ink, the ink leaks from the temporarily established ink supply path when the high pressure is applied to the ink in the supply path. As a result, it is not possible to eject the high viscosity ink in the record element by applying high pressure to the ink.

In the method of supplying the ink through the temporary supply path, dust may be deposited on the supply path establishing means while the supply path is not established such as when the carriage is moved to print data. The dust may go into the supply path when the supply path is temporarily established and block the leading end of the nozzle. This leads to non-discharge of the ink droplet.

SUMMARY OF THE INVENTION

It is an object of the present invention to provide a high precision and highly reliable recorder.

It is another object of the present invention to provide a recorder which can establish a recording liquid path more easily than in a prior art recorder.

It is another object of the present invention to provide a recorder which can supply recording liquid in a put in system by establishing a recording liquid path as required instead of using a long flexible tube and which clears a clog in a nozzle or orifice by pressurized recovery of the recording liquid.

It is another object of the present invention to provide a compact and light recorder.

It is another object of the present invention to provide a recorder in which a supply path for supplying ink to a first tank movable with a record element from a second tank fixedly mounted on the recorder is temporarily established and a pressure can be applied to the recording liquid flowing through the supply path while the recording liquid is supplied.

It is another object of the present invention to provide a recorder having a structure which prevents leakage of pressure applied to the recording liquid out of the supply path.

It is another object of the present invention to provide a highly reliable recorder which prevents blockage of the supply of the recording liquid due to introduction of dust into the recording liquid path and prevents malfunction of a record element.

It is another object of the present invention to provide a recorder comprising a record element for recording data on a recording medium by record liquid, a first tank movable with the record element for storing therein the recording liquid to be supplied to the record element, a second tank fixedly mounted on a body of the recorder for storing therein the recording liquid to be supplied to the first tank, a recording liquid path for connecting the first tank to the second tank, connection/disconnection means for connecting or disconnecting the recording liquid path, supply means for supplying the recording liquid when the recording liquid path is established, said connection/disconnection means being arranged separately on the part of the record element and on the part of the second tank, and means for absorbing a mechanical stress created when the connection/disconnection means connects the recording liquid path to prevent the mechanical stress from being applied to a carriage on which the record element is mounted.

It is another object of the present invention to provide a recorder comprising a record element for recording data on a record medium by recording liquid, a first tank movable with the record element for storing therein the recording liquid to be supplied to the record element, a second tank fixedly mounted on a body of the recorder for storing therein the recording liquid to be supplied to the first tank, a recording liquid path for connecting the first tank with the second tank, connection/disconnection means for connecting or disconnecting the recording liquid path and supply means for supplying pressurized recording liquid when the recording liquid path is established.

It is another object of the present invention to provide a recorder comprising a record element for recording data on a record medium by recording liquid, a first tank movable with the record element for storing therein the recording liquid to be supplied to the record element, a second tank fixedly mounted on a body of the recorder for storing therein the recording liquid to be supplied to the first tank, a recording liquid path for connecting the first tank with the second tank, connection/disconnection means for connecting or disconnecting the recording liquid path, supply means for supplying the recording liquid when the recording liquid path is established, said connection/disconnection means including a member having an opening through which a member for constructing the recording liquid path extends, and said member having the opening being supported to be movable axially of the recording liquid path.

It is another object of the present invention to provide a recorder comprising a record element for recording data on a record medium by recording liquid, a first tank movable with the record element for storing therein the recording liquid to be supplied to the record element, a second tank fixedly mounted on a body of the recorder for storing therein the recording liquid to be supplied to the first tank, a recording liquid path for connecting the first tank with the second tank, connection/disconnection means for connecting or disconnecting the recording liquid path, supply means for supplying the recording liquid when the recording liquid path is established, said connection/disconnection means including a curtain blade for protecting the inside of the recording liquid path.

DESCRIPTION OF THE PREFERRED EMBODIMENTS

Figure 1:
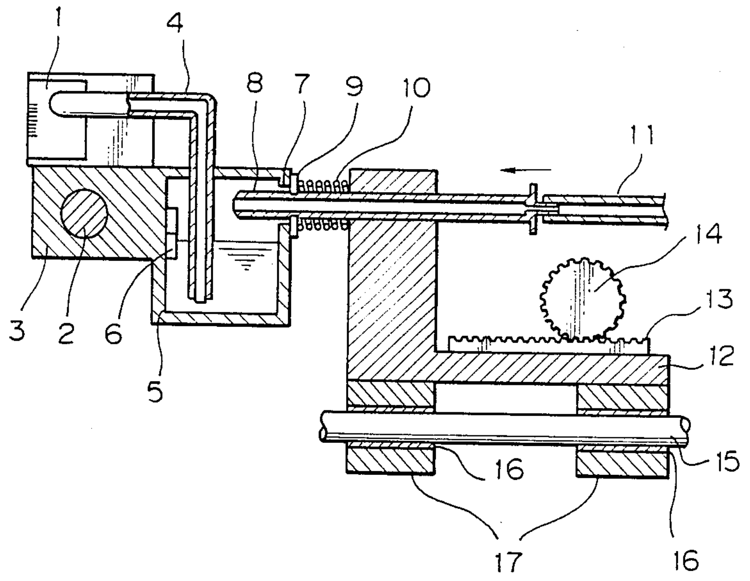
Fig. 1 PRIOR ART
FIG. 1 is a sectional view of a prior art recorder.
Figure 2:
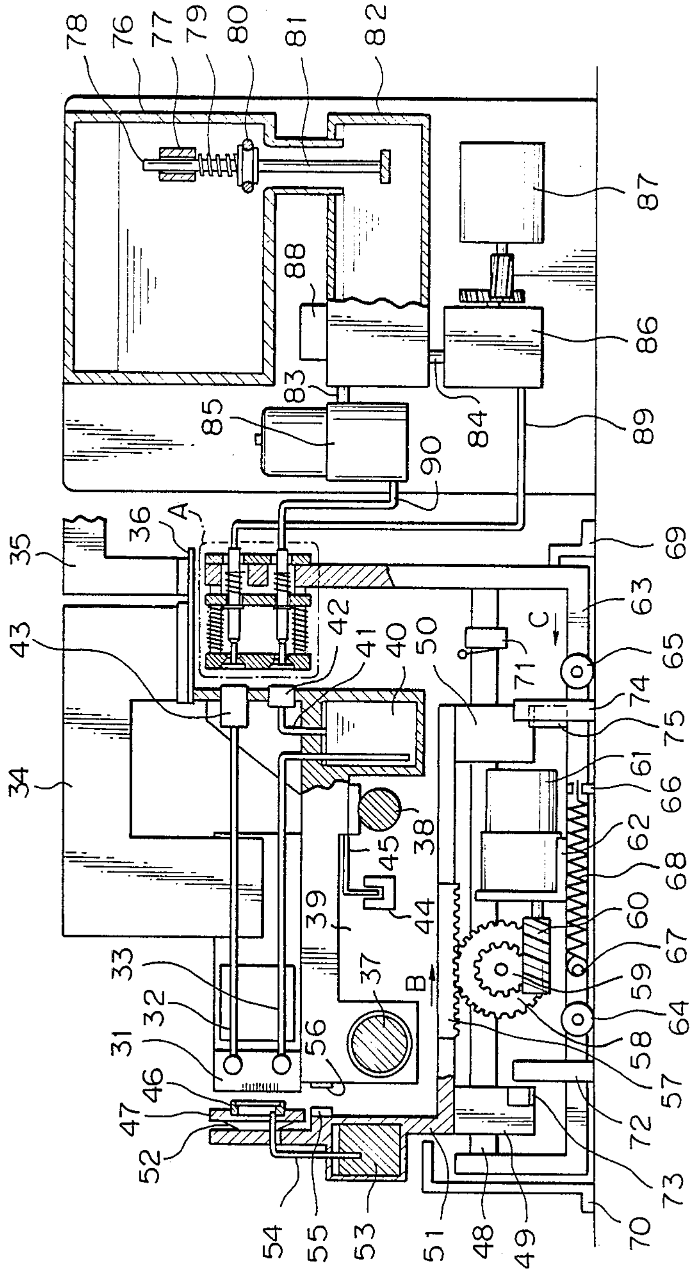
FIGS. 2, 3A, 3B and 5 show sectional views of embodiments of the present invention.
Figure 3A:
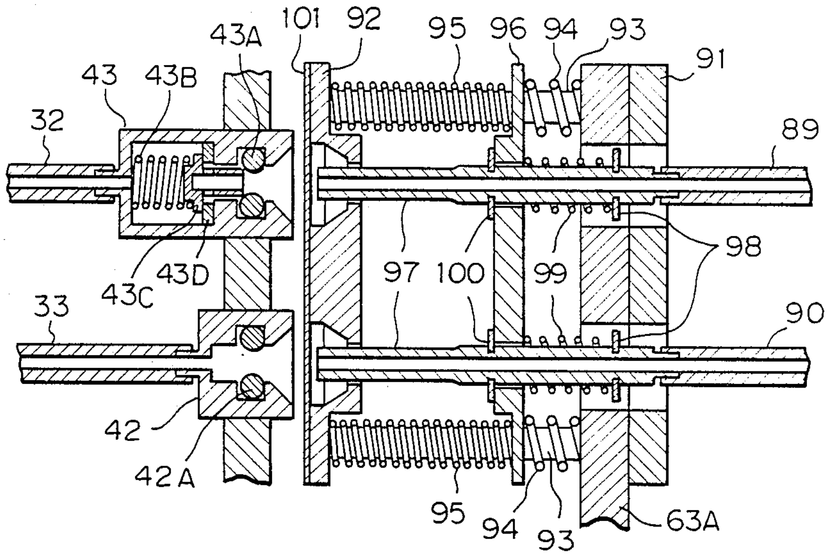
Figure 3B:
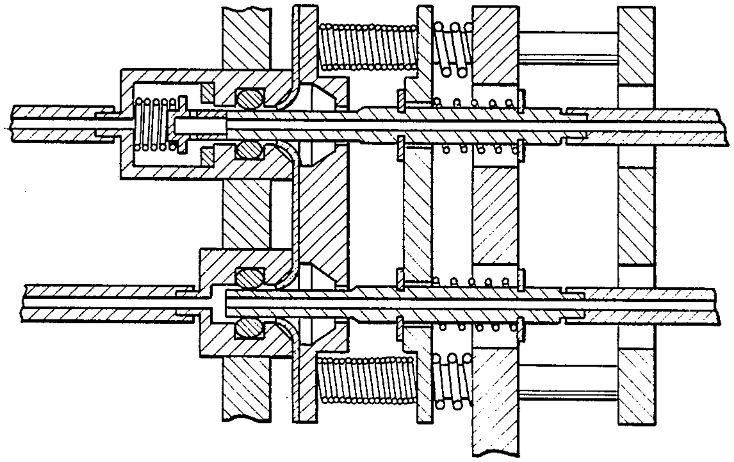

FIGS. 2, 3A and 3B show sectional views of one embodiment of the present invention.

In FIG. 2, numeral 31 denotes a record element which is an ink jet head in the present embodiment, numerals 32 and 33 denote ink supply tubes, and numeral 36 denotes a relay board for sending signals supplied through a flat cable 35 to the ink jet head 31 through a flexible cable 34. It is mounted on a head carriage 39 supported by slide shafts 37 and 38. Numeral 41 denotes an ink path for connecting a tube connector 42 of connection/disconnection means for connecting or disconnecting an ink supply path and a first ink tank 40 on the carriage 39, numeral 43 denotes a tube connector having a valve function, numeral 44 denotes a photo-interrupter for detecting that the carriage is at a home position, numeral 45 denotes an interrupt plate, and numeral 47 denotes a cap holder in which a rubber ink jet head cap 46 is accommodated. It is supported by a leaf spring 52 fixed to a cap carriage 51 having a slide shaft 48 slidably supported by slide bearings (not shown) in bearing housings 49 and 50. Numeral 54 denotes a flexible tube for connecting a tank 53 in which ink is impregnated in a porous material and the cap 46, numeral 55 denotes a stopper which faces a stopper receptacle 56, and numeral 57 denotes a rack fixed to the cap carriage 51. It transmits a rotational force of a motor 61 fixed on a tube connect carriage 63 by a clamp member 62 to the cap carriage 51 through a worm wheel 59 which is coaxial with a spur gear 57 and a worm 60. The tube connect carriage 63 is supported by wheels 64 and 65 such that it is movable to left and right and pulled by a tension spring 68 spanned between a pin 66 projecting from a base board and a pin 67 projecting from the tube connect carriage 63 and abuts against a stopper 69. Numeral 70 denotes a stopper which restricts movement of the cap carriage 51, numeral 71 denotes a microswitch fixed to the slide shaft 48, numerals 72 and 74 denote photo-interrupters similar to the photo-interrupter 44 fixed to the base plate, numeral 73 denotes an interrupt plate fixed to the bearing housing 49, and numeral 75 denotes an interrupt plate fixed to the tube connect carriage 63. In FIG. 2, the interrupt plate 75 interrupts the light path of the photo-interrupter 74. Numeral 76 denotes an ink supply tank having a valve comprising a slide bearing 77, a slide shaft 78, a compression spring 79, an O-ring 80 and a shaft 81, and numeral 82 denotes a second tank which cooperates with the first tank 40 and is connected to a valve 85 and a pump 86 driven by a motor 87, through connect paths 83 and 84. Numeral 88 denotes a filter case. Atmospheric pressure is applied to the ink in the second tank 82 through a filter housed in the filter case 88. Numerals 89 and 90 denote ink supply tubes which are connected to a tube connect unit A. A detail of the tube connect unit A which forms the connection/disconnection means is explained with reference to FIGS. 3A and 3B.

In FIG. 3A, the record liquid path is not established, and in FIG. 3B it is established.

Figure 4:
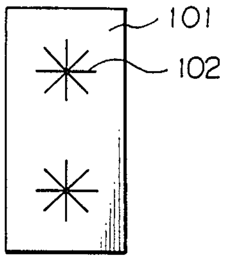
FIG. 4 shows a plan view of a curtain blade shown in FIG. 3, FIGS. 6A and 6B show sectional views of tube connectors.

In FIG. 3A, numerals 91 and 92 denote frame members for holding four guide shafts 93 (two of which are not shown), and numerals 94 and 95 denote compression spring through which the guide shafts 93 extend. A plate 96 which is movable along the guide shafts 93 is supported between the two springs. The plate 96 has a hole formed therein, which has a slightly larger diameter than that of the needle pipe 97. As the needle pipe 97 extends through the hole, it is held essentially perpendicularly to the plate 96 because a flange ring 100 is pushed against the plate 96 by the force of 99 compression spring 99 inserted between the plate 96 and a flange ring 98. Numeral 63A denotes a portion of the tube connect carriage 63 shown in FIG. 2. It is movable along the guide shaft 93 as is the plate 96. A right end of the spring 94 abuts against the portion 63A of the tube connect carriage. Numeral 101 denotes a rubber curtain blade which has cuttings 102 as shown in FIG. 4. Numerals 42A and 43A denote O-rings housed in the tube connectors 42 and 43, and numeral 43D denotes a rubber packing. In FIG. 3A, the path is closed by a flange of a poppet 43C which is pushed by a spring 43B.

The operations of FIGS. 2, 3A and 3B are explained.

The ink jet head 31 is mounted on the head carriage 39 and moved therewith along the slide shafts 37 and 38 and forms an image on a record sheet (not shown) in response to signals supplied through the flat cable 35, relay board 36 and flexible cable 34. After a predetermined number of record sheets have been printed, the head carriage 31 moves to a position at which the interrupt plate 45 interrupts the photo-interrupter 44 and stops thereat. As the head carriage 31 stops, the motor 61 rotates and the cap carriage 51 is moved in a direction of an arrow B by the worm 60, worm wheel 59, spur gear 58 and rack 57 and the cap 46 covers the nozzle of the ink jet head 31. As the motor 61 further rotates, the leaf spring 52 is flexed and the stopper 55 abuts against the stopper receptacle 56 on the part of the carriage 39. As a result, the cap 46 makes close contact to the leading end of the head by the flex force of the leaf spring 52. The cap 46 is not urged to the head 31 with a stronger force. Under this condition, the interrupt plate 73 interrupts the photo-interrupter 72.

As the motor 61 further rotates, the cap carriage 51 cannot move in the direction B because the stopper 55 abuts against the stopper receptacle 56, and the tube connect carriage 63 which has been urged to the stopper 69 by the spring 68 overcomes the tensional force of the spring 68 and starts to move in a direction C. As the tube connect carriage 63 moves, the tube connect unit A abuts against the tube connectors 42 and 43 fixed to the head carriage 39. The movement of the tube connect carriage 63 is transmitted to the plate 69 through the spring 94 and further to the needle pipe 97 from the plate 96 through the flange ring 100. The needle pipe 97 extends through the curtain blade 101 and the O-rings 42A and 43A as shown in FIG. 3B, pushes in the poppet 43C which is urged to the rubber packing 43D by the spring 43B and establishes the record liquid path which is free from leakage for the high internal pressure. The microswitch 71 is pushed by the end surface of the bearing housing 50. The curtain blade 101 functions as a blade which prevents introduction of dusts when the record liquid path is not established, and removes the dusts deposited to the needle pipe 97 when the needle pipe 97 extends through the blade.

Since the needle pipe 97 is inserted into the tube connectors 42 and 43 through the spring 94, it is inserted with a substantially constant insertion force irrespective of a variation of the stop position of the tube connect carriage 63. Even if the needle pipe 97 is deeply inserted and abuts against a deep portion of the tube connector 42, no shocking load is applied to the respective parts because the spring 94 flexes.

Since the tube connect carriage 63 is movably supported by the wheels 64 and 65, and pulled by the spring 68 in the direction B of FIG. 2, the force applied to the slide shaft 37 is only the tensional force of the spring 68 irrespective of the magnitude of the insertion force.

When the outer diameter of the needle pipe 97 is 3 mm and the sealing O-rings 42A and 43A housed in the tube connectors 42 and 43 are P3 O-rings, the insertion force is approximately 300–350 grams per needle pipe. In this case, the ink in the supply path does not leak when the internal pressure is as high as 3 $Kg/cm^2$.

Figure 5:
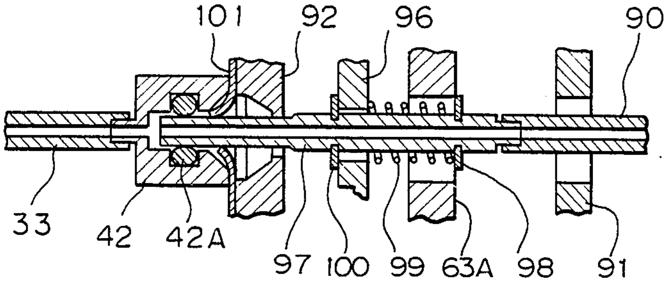

Since the needle pipe 97 is merely supported normally to the plate 96 by the force of the spring 99, it can freely move normally to the insertion direction within the range of the diameters of the holes formed in the frames 91 and 92 and the plate 96. Accordingly, even if there is a misalignment between the center of the tube connector 42 and the axial center of the needle pipe 97, the insertion force does not essentially increase because the needle pipe 97 is moved as shown in FIG. 5.

When the microswitch 71 is pushed, the motor 61 stops to rotate and the motor 87 rotates. Thus, the pump 86 of the supply means is driven and the ink in the second tank 82 is supplied to the first tank 40 through the ink supply tube 89, needle pipe 97, tube connector 43, ink supply tube 32, liquid chamber in the ink jet head 31 and ink supply tube 33. Air bubbles in the supply path, air in the first tank 40 and the ink in the first tank 40 in excess of its capacity are recovered into the second tank 82 through the tube connector 42, ink supply tube 90, valve 85 and connection path 83.

Under this condition, when the valve 85 which has opened the flow path is closed, the pressure of the ink in the supply path from the pump 86 to the valve 85 through the ink jet head 31 increases with the drive time of the pump 86 and finally ejects the high viscosity ink at the leading end of the nozzle of the ink jet head 31.

After the closure of the valve 85 for a predetermined time, the valve 85 is opened and the ink is supplied to the first tank 40 and the high viscosity ink is ejected by pressurizing the ink in the supply path. If the ejection of the high viscosity ink is not required, the valve 85 need not be closed.

If a printing operation is not effected for a while, the pump 86 and the valve 85 are not operated after the depression of the microswitch 71 and the recorder stands by until the next instruction is issued. Thus, the evaporation of the ink from the leading end of the nozzle is prevented by the cap 46 and the introduction of the dusts from the openings of the tube connectors 42 and 43 when the record liquid path is established is prevented. In the present embodiment, since the worm 60 is used to move the cap carriage 51 and the tube connect carriage 63, the motor 61 does not reversely rotate after the power is turned off and the above condition is held as it is. Thus, the head 31 can be preserved in a very stable environment.

When the print operation is effected after the supply of the ink to the first tank 40 or the ejection of the high viscosity ink, the motor 61 is reversely rotated to the position shown in FIG. 2. Only the photo-interrupter 74 of the photo-interrupters 72 and 74 and the microswitch 71 is interrupted by the interrupt plate 75 and it is turned on (if it is normally off).

Two ink supply tubes 32 and 33 for the supply and recovery operations are connected to the ink jet head 31. When the cap 46 and the needle pipe 97 are separated and the head carriage 39 is rendered movable along the slide shafts 37 and 38, the flow path is closed by the poppet 43C housed in the tube connector 43 on the part of the ink supply tube 32. Thus, air does not enter into the ink supply tube 32. If the flow path close mechanism is not provided, the ink flows into the first tank 40 through the liquid chamber in the ink jet head 31 because the ink supply tube 32 is at a higher level than the first tank 40, or not only the ink in the first tank 40 but also the ink in the ink supply tube 32 are consumed by the printing operation. As a result, air is introduced into the liquid chamber of the ink jet head 31 through the ink supply tube 32 and this causes non-discharge of the ink.

In the present embodiment, two pairs of supply path establishing means are provided. As the number of connect/disconnect means for establishing the recording liquid paths increases by the requirement for a color printer or a multi-head high speed printer, interference due to the errors in the hole positions takes place and the insertion force usually abruptly increases. In the present embodiment, there is no essential increase of the insertion force due to the increase of the number of recording liquid path connect/disconnect means (recording liquid path establishing means).

When the outer diameter of the needle pipe is 3 mm and the O-ring housed in the tube connector is P3 O-ring, the insertion force required per needle pipe is 300–350 grams as described above, and 400–600 grams at most. If 20 needle pipes are simultaneously inserted into the tube connectors, an insertion force of approximately 20 kg is required to establish the recording liquid paths in accordance with the present invention. The ink in the recording liquid path does not leak when the internal pressure of as high as 3 $Kg/cm^2$ is applied to the ink in the established recording liquid path.

If the head carriage is held between the cap carriage and the tube connector carriage, the force applied to the slide shaft through the head carriage is only the force by the tension spring having one end thereof fixed to the tube connector carriage, and the increase of the insertion force has no connection thereto.

When 20 needle pipes having an outer diameter of 3 mm are simultaneously inserted into the tube connectors having P3 O-rings housed therein, an insertion force of approximately 20 kg is required. In a structure in which the insertion force directly acts on the slide shaft, the diameter of the slide shaft must be increased to withstand the insertion force. In the present invention, a standard slide shaft may be used because only the tension of the tension spring, for example, approximately 500 grams is applied to the slide shaft.

Figure 6A:
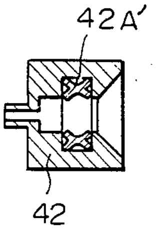
Figure 6B:
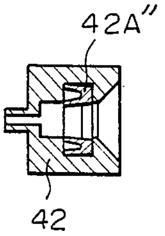

In the present embodiment, the O-rings were used as the sealing members of the tube connectors 42 and 43, although other members may be used. For example, sealing rings 42A' and 42A" having different sectional shapes as shown in FIGS. 6A and 6B may be used or a plurality of such sealing rings may be stacked. The material of the sealing ring may be rubber which is frequently used in the O-ring, Teflon synthetic material or composite material of those materials and a metal.

While an ink jet recorder which jets the recording liquid was described as the record element, the present invention is applicable to other recorders which uses other recording liquid such as a pen recorder.

Figure 7A:
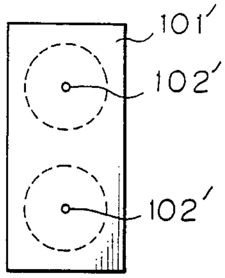
FIG. 7A shows a plan view of another curtain blade.
Figure 7B:
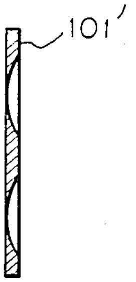
FIGS. 7B, 8, 9A and 9B show sectional views of other embodiments of the present invention.

In the above embodiment, the curtain blade 101 is made of a rubber sheet having a plurality of cuttings as shown in the plan view of FIG. 4. The curtain blade may be formed as shown in a plan view of FIG. 7A and a sectional view of FIG. 7B. FIG. 7A is a front view of the curtain blade 101' and FIG. 7B is a sectional view thereof.

In FIG. 7A, numeral 102' denotes a hole through which the needle pipe 97 extends. A diameter thereof is smaller than ⅓ of the diameter of the needle pipe 97. The curtain blade 101' is made of a highly flexible rubber material and the thickness of the sheet is reduced radially outwardly of the hole 102' as shown in FIG. 7B.

The curtain blade 101' thus formed has a very high flexibility in the vicinity of the hole 102'. Accordingly, it makes good contact to the needle pipe 97 and dust is more perfectly removed and the resistance to the insertion of the needle pipe 97 is reduced.

When the curtain blade 101 shown in FIG. 4 and the curtain blade 101' shown in FIG. 7 are used in series, the dust proof effect is more effective because the hole 102' of the curtain blade 101' is closed by the curtain blade 101.

Figure 8:
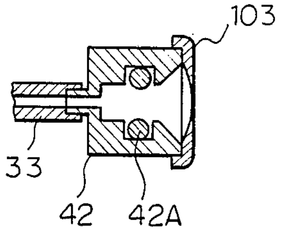

FIG. 8 shows a sectional view of another embodiment of the present invention. Numeral 103 denotes a rubber sheet formed in the same manner as the curtain blade 101' of FIGS. 7A and 7B. The rubber sheet 103 is applied to the opening of the tube connector 42 to prevent introduction of dust.

Figure 9A:
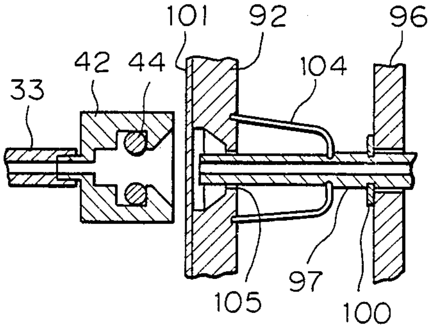
Figure 9B:
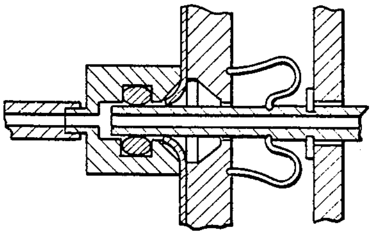

FIGS. 9A and 9B show sectional views of other embodiment of the present invention. In FIG. 9A the recording liquid path is not established, and in FIG. 9B, it is established. Numeral 104 denotes a bellows made of a soft rubber material. One of two openings is fixed by bonding or baking to a frame member 92 and the other is fixed to a needle pipe 97. Thus, the introduction of the dust from the clearance 105 between the frame member 92 and the needle pipe 97 is prevented. When the recording liquid path is established, the bellows 104 is deformed as shown in FIG. 9B. Therefore, the insertion force for the needle pipe 97 does not increase.

As described above, in the present invention, freedom in the insertion direction is imparted to the member having the opening for the recording liquid path, which is the connect/disconnect means for selectively establishing the recording liquid path so that the increase of the insertion force due to the misalignment of the two opposing openings is prevented, and the highly reliable recording liquid path can be established. Therefore a number of recording liquid paths can be simultaneously established with a much smaller insertion force than required in a prior art recorder. Thus, the weight of the support members and the size of the motor can be reduced. The effect is further enhanced by imparting freedom in the insertion direction of the record liquid path forming member and in the plane normal to the insertion direction.

In the present invention, the insertion force required to establish the supply path in the recorder having the selective recording liquid supply means does not act on the slide shaft along which the carriage on which the record element is mounted moves. Thus, the amount of flexture of the slide axis is small and high precision carriage scan is attained. Since no large insertion force acts to the slide shaft, the diameter the slide shaft may be of standard irrespective of the magnitude of the insertion force, and the weight of the recorder can be reduced.

When the path to supply the recording liquid to the first tank which is moved with the record element from the second tank is established, the recording liquid does not leak from the supply path even if a high pressure is applied to the recording liquid flowing in the supply path. Accordingly, the high viscosity recording liquid in the record element can be ejected by applying high pressure thereto so that the image formed on the record sheet can be kept at a high quality and a highly reliable recorder is provided.

In accordance with the present invention, the introduction of dust from the selective recording liquid supply path establishing means is suppressed and a highly reliable recorder is provided.

I claim:

1. A recorder comprising:

a record element for recording data on a record medium by recording liquid;

a first tank movable with said record element for storing therein said recording liquid to be supplied to said record element;

a second tank fixedly mounted on a body of said recorder for storing therein said recording liquid to be supplied to said first tank;

a plurality of recording liquid paths for connecting said first tank with said second tank;

connection/disconnection means for connecting and disconnecting said recording liquid paths;

supply means for supplying said recording liquid when said recording liquid paths are established;

said connection/disconnection means including members, each having an opening through which a member for constructing a corresponding said recording liquid path extends; and said members having the openings being supported to be movable axially of said recording liquid paths relative to said first tank and said connection/disconnection means being supported to be movable substantially normal to said axial direction.

2. A recorder according to claim 1 wherein said connection/disconnection means includes a curtain blade.

3. A recorder according to claim 1 wherein said connection/disconnection means is separately arranged on said record element and on said second tank so that said connection/disconnection means arranged on said second tank is movable relative thereto, and further comprising means for absorbing a mechanical stress created when said connection/disconnection means connects said recording liquid paths to prevent the mechanical stress from being applied to a carriage on which said record element is mounted.

4. A recorder according to claim 3 wherein said supply means includes means for supplying pressurized recording liquid.

5. A recorder according to claim 4 wherein said connection/disconnection means includes a curtain blade for protecting the inside of said recording liquid paths.

6. A recorder according to claim 3 wherein said connection/disconnection means includes a curtain blade for protecting the inside of said recording liquid paths.

7. A recorder according to claim 1 wherein said supply means includes means for supplying pressurized recording liquid.

8. A recorder according to claim 7 wherein said connection/disconnection means includes a plurality of connector, each having a pipe member and a sealing member to be fitted to the pipe member.

9. A recorder according to claim 8 wherein said sealing member is an O-ring.

10. A recorder according to claim 8 wherein said connectors include a path block mechanism for preventing air from entering when said recording liquid paths are not established.

11. A recorder according to claim 10 wherein said path block mechanism includes a value abuttable to said pipe member.

12. A recorder according to claim 1 wherein said connection/disconnection means includes a curtain blade for protecting the inside of said recording liquid paths when said connection/disconnection means is disconnected.

13. A recorder according to claim 1 wherein said supply means applies pressure to said recording liquid when said recording liquid paths are established.

14. A recorder according to claim 13 wherein said connection/disconnection means includes a connector having a pipe member and a sealing member to be fitted to the pipe member.

15. A recorder according to claim 14 wherein said sealing member is an O-ring.

16. A recorder according to claim 14 wherein said connector includes a path clock mechanism for preventing air from entering when said recording liquid path is not established.

17. A recorder according to claim 16 wherein said path block mechanism includes a valve abuttable to said pipe member.

18. A recorder according to claim 13 wherein said connection/disconnection means includes a curtain blade for protecting the inside of said recording liquid path.

19. A recorder comprising:

a record element for recording data on a record medium by recording liquid;

a first tank movable with said record element for storing therein said recording liquid to be supplied to said record element;

a second tank fixedly mounted on a body of said recorder for storing therein said recording liquid to be supplied to said first tank;
a recording liquid path for connecting said first tank with said second tank;
connection/disconnection means for connecting and disconnecting said recording liquid path;
supply means for supplying said recording liquid when said recording liquid path is established;
means for absorbing a mechanical stress created when said connection/disconnection means connects said recording liquid path to prevent the mechanical stress from being applied to a carriage on which said record element is mounted;
said connection/disconnection means including a member having an opening though which a member for constructing said recording liquid path extends;
said member having the opening being supported to be movably axially of said recording liquid path; and
said connection/disconnection means comprising a pair of connection/disconnection elements, wherein one of said connection/disconnection elements is arranged on said carriage and the other connection/disconnection element is arranged on a movable table other than said carriage, and said carriage is held by a movable restriction member which is abuttable to said carriage and to at least a portion of said connection/disconnection means arranged on said movable table when said recording liquid path is established.

20. A recorder comprising:
a record element for recording data on a record medium by recording liquid;
a first tank movable with said record element for storing therein said recording liquid to be supplied to said record element;
a second tank fixedly mounted on a body of said recorder for storing therein said recording liquid to be supplied to said first tank;
a recording liquid path for connecting said first tank to said second tank;
connection/disconnection means for connecting and disconnecting said recording liquid path;
supply means for supplying said recording liquid when said recording path is established;
said connection/disconnection means being separately arranged on said record element and on said second tank so that said connection/disconnection means arranged on said second tank is movable relative thereto;
means for absorbing a mechanical stress created when said connection/disconnection means connects said recording liquid path to prevent the mechanical stress from being applied to a carriage on which said record element is mounted; and
said means for absorbing including a plurality of buffer means provided on at least one of said record element and said second tank.

21. A recorder according to claim 20 wherein said supply means includes means for supplying pressurized recording liquid.

22. A recorder according to claim 21 wherein said connection/disconnection means includes a connector having a pipe member and a sealing member to be fitted to the pipe member.

23. A recorder according to claim 21 wherein said sealing member is an O-ring.

24. A recorder according to claim 22 wherein said connector includes a path block mechanism for preventing air from entering when said recording liquid path is not established.

25. A recorder according to claim 24 wherein said path block mechanism includes a valve abuttable to said pipe member.

26. A recorder according to claim 21 wherein said connection/disconnection means includes a curtain blade for protecting the inside of said recording liquid path.

27. A recorder according to claim 20 wherein said connection/disconnection means includes a curtain blade for protecting the inside of said recording liquid path.

28. A recorder according to claim 20 further comprising capping means for cooperating with said record element.

29. A recorder comprising:
a record element for recording data on a record medium by recording liquid;
a first tank movable with said record element for storing therein said recording liquid to be supplied to said record element;
a second tank fixedly mounted on a body of said recorder for storing therein said recording liquid to be supplied to said first tank;
a recording liquid path for connecting said first tank to said second tank;
connection/disconnection means for connecting and disconnecting said recording liquid path;
supply means for supplying said recording liquid when said recording liquid path is established;
means for absorbing a mechanical stress created when said connection/disconnection means connects said recording liquid path to prevent the mechanical stress from being applied to a carriage on which said record element is mounted; and
said connection/disconnection means being arranged separately, wherein one of said connection/disconnection means is arranged on said carriage and the other connection/disconnection means is arranged on a movable table other than said carriage, and said carriage is held by a movable restriction member which is abuttable to said carriage and to at least a portion of said connection/disconnection means arranged on said movable table when said recording liquid path is established.

30. A recorder according to claim 29 wherein capping means is mounted to said restriction member for cooperating with said record element.

31. A recorder comprising:
a record element for recording data on a record medium by recording liquid;
a first tank movable with said record element for storing therein said recording liquid to be supplied to said record element;
a second tank fixedly mounted on a body of said recorder for storing therein said recording liquid to be supplied to said first tank;
a recording liquid path for connecting said first tank with said second tank;
connection/disconnection means for connecting and disconnecting said recording liquid path;

supply means for supplying said recording liquid when said recording liquid path is established; and said connection/disconnection means including a curtain blade for protecting the inside of said recording liquid path, said curtain blade including a hole formed therein through which a member constituting part of said recording liquid path extends to connect said recording liquid path, wherein said recording liquid path is protected when said member is withdrawn.

32. A recorder according to claim 31 wherein said curtain blade is made of a rubber sheet.

33. A recorder according to claim 32 wherein a thickness of said curtain blade is reduced radially inwardly of said hole.

34. A recorder according to claim 32, wherein a diameter of said hole is smaller than one-third of a diameter of said member for constituting said recording liquid path.

35. A recorder comprising:

a record element for recording data on a record medium by recording liquid;

a first tank movable with said record element for storing therein said recording liquid to be supplied to said record element;

a second tank fixedly mounted on a body of said recorder for storing therein said recording liquid to be supplied to said first tank;

a recording liquid path for connecting said first tank with said second tank;

connection/disconnection means for connecting and disconnecting said recording liquid path;

supply means for supplying said recording liquid when said recording liquid path is established; and said connection/disconnection means including a plurality of curtain blades for protecting the inside of said recording liquid path, each said curtain blade including a hole formed therein through which a member constituting part of said recording liquid path extends.

36. A recorder according to claim 35 wherein said curtain blades include a blade having a plurality of cuttings and a blade having a hole.

37. A recorder comprising:

a record element for recording data on a record medium by recording liquid;

a first tank movable with said record element for storing therein said recording liquid to be supplied to said record element;

a second tank fixedly mounted on a body of said recorder for storing therein said recording liquid to be supplied to said first tank;

a recording liquid path for connecting said first tank with said second tank;

connection/disconnection means for connecting and disconnecting said recording liquid path;

supply means for supplying said recording liquid when said recording liquid path is established; and said connection/disconnection means including a curtain blade for protecting the inside of said recording liquid path, wherein a member constituting part of said recording liquid path can extend through a hole formed in said curtain blade and said member has a bellows separate from said curtain blade.

* * * * *

UNITED STATES PATENT AND TRADEMARK OFFICE

CERTIFICATE OF CORRECTION

PATENT NO. : 4,757,331

DATED : July 12, 1988

INVENTOR(S) : NOBUTOSHI MIZUSAWA

It is certified that error appears in the above-identified patent and that said Letters Patent is hereby corrected as shown below:

COLUMN 5

Line 28, "spring" should read --springs--.
Line 35, "99" should read --a--.

COLUMN 6

Line 10, "plate 69" should read --plate 96--.

COLUMN 8

Line 26, "uses" should read --use--.
Line 58, "bodiment" should read --bodiments--.
Line 63, "the" (second occurrence) should be deleted.

COLUMN 9

Line 22, "flexture" should read --flexure--.
Line 24, "diameter the" should read --diameter of the--.
Line 25, "of" (first occurrence) should be deleted.

COLUMN 10

Line 25, "connector," should read --connectors,--.
Line 35, "value" should read --valve--.
Line 52, "clock" should read --block--.

COLUMN 11

Line 16, "though" should read --through--.
Line 20, "movably" should read --movable--.

UNITED STATES PATENT AND TRADEMARK OFFICE

CERTIFICATE OF CORRECTION

PATENT NO. : 4,757,331

DATED : July 12, 1988

INVENTOR(S) : NOBUTOSHI MIZUSAWA

It is certified that error appears in the above-identified patent and that said Letters Patent is hereby corrected as shown below:

COLUMN 12

Line 1, "claim 21" should read --claim 22--.

COLUMN 13

Line 14, "claim 32" should read --claim 31--.
Line 17, "claim 32" should read --claim 31--.

Signed and Sealed this

Fourteenth Day of February, 1989

*Attest:*

DONALD J. QUIGG

*Attesting Officer*

*Commissioner of Patents and Trademarks*